United States Patent Office 3,792,071
Patented Feb. 12, 1974

3,792,071
PROCESS FOR THE MANUFACTURE OF ALKOXY-SILANES AND ALKOXY-POLYSILOXANES
Siegfried Nitzsche, Norbert Zeller, Werner Graf, and Ignaz Bauer, Burghausen, Germany, assignors to Wacker-Chemie G.m.b.H., Munich, Germany
No Drawing. Filed Dec. 2, 1971, Ser. No. 204,355
Claims priority, application Germany, Dec. 11, 1970,
P 20 61 189.6
Int. Cl. C07f 7/18
U.S. Cl. 260—448.8 R   7 Claims

ABSTRACT OF THE DISCLOSURE

An improved continuous process for alkoxysilanes and alkoxypolysiloxanes is disclosed whereby alcohol reactants are introduced into a column below the introduction point of halosilane reactants or in the lowest one-third of the column, temperature is maintained above the boiling point of the alcohol, and the product is removed below the point of introduction of the alcohol.

The work of A. Raskai and colleagues in "Chemische Technik" 1957, page 463 to 466, and of H. G. Emblem, British patent specifications 992,111 and 993,249, has already described processes for the continuous manufacture of alkoxysilanes or alkoxypolysiloxanes by reaction of chlorosilanes with alcohols and, if desired, water. In these processes products with a hydrogen chloride content of 0.2 to 0.6% are obtained without relatively expensive measures and without measures which make the working up of the product more difficult, such as the addition of acid-binding agents, for example pyridine, the conjoint use of solvents and/or inert gases, or the use of reduced pressure in order to remove the hydrogen chloride produced in the reaction as quickly as possible. In these processes, either gaseous alcohol and gaseous chlorosilane are introduced into a column in the stoichiometric ratio from opposing points in the longitudinal sides of the column approximately half way up the column or gaseous silane is introduced from below into a column, in counter-current to alcohol, which may contain water, which flows down the column.

This invention provides a process, which compared to the processes described above gives even better product yields and products with a hydrogen chloride content of less than 5 parts per million (p.p.m.), that is to say products with about one thousandth of what has hiterto been the lowest hydrogen chloride content attainable without after-treatment or other expensive measures. Further compared with the processes described in the first of the above-mentioned literature references, a vessel for the evaporation of silane is not necessary. Because of the low hydrogen chloride content the products produced in accordance with the invention also do not require the removal of residual hydrogen chloride by means of dry ammonia, which is necessary in a further process described in German patent specification No. 913,769, according to which, in order to manufacture alkoxysilanes, liquid alcohol and liquid chlorosilane are introduced in co-current into the reaction vessel from above.

The process of the invention for the continuous manufacture of optionally substituted alkoxysilanes or optionally substituted alkoxypolysiloxanes comprising reacting chlorosilanes with optionally substituted alcohols and, if desired, water, in a column provided with a reflux condenser and kept at an elevated temperature, wherein (a) the chlorosilane is introduced at the head of the column and the alcohol is introduced in the gaseous form from below or at a point in the lowest one-third of the length of the column and water, is used conjointly, is introduced at any desired point of the column, (b) the reaction product is removed from the column at a point below the point of introduction of the alcohol or at the lower end, (c) for at least two-thirds of the zone between the inlet of the alcohol and the inlet of the silane into the column, the column is maintained, over its entire internal cross-section, at a temperature at least ½° C. above the boiling point of the particular alcohol used at the particular pressure prevailing in the column and (d) during the reaction excess alcohol boiling under reflux is constantly present at the head of the column.

As chlorosilanes it is possible to use, in the process of the invention, all chlorosilanes which have hitherto been used in such processes. These chlorosilanes are, especially, compounds of the general formula $$R_nSiCl_{4-n}$$

wherein R represents identical or different atoms or groups which are inert under the reaction conditions towards the particular alcohols employed, and $n$ is 0, 1, 2 or 3.

Examples of R are hydrogen and especially hydrocarbon radicals, for example, methyl, vinyl, phenyl and tolyl radicals. R may also be hydrocarbon radicals substituted by atoms or groups which are inert under the reaction conditions, for example halogenoalkyl radicals, in which the carbon atoms to which the halogen is bonded are in the alpha-position to the Si-atom, for example the gamma-chloropropyl radical, and halogenoaryl radicals, for example chlorophenyl radicals. Further examples of hydrocarbon radicals substituted by inert groups are the beta-cyanoethyl radical and the gamma-methacryloxypropyl radical. Because of the easy accessibility of the chlorosilanes it is especially preferred that $n$ should be 0 or 1 and R should be the methyl radical. Mixtures of different chlorosilanes can be used. This can be of particular advantage if water is conjointly used in the process.

Preferably, the chlorosilanes are employed in a liquid form, as long as this requires the minimum expenditure, and preferably the silanes are at room temperature until they enter the column.

When water is used conjointly in the process the product is an alkoxypolysiloxane and in this case it may be necessary to dilute the chlorosilane with an inert solvent of higher boiling point than the temperature at which at least two-thirds of the zone between the inlet of the alcohol and the inlet of the silane into the column are kept, so that the alkoxypolysiloxane is obtained in solution and so is easier to remove from the column than the viscous polymer.

It is possible to employ in the process of the invention any desired aliphatic alcohol of which the boiling point is below that of the alkoxysilane or alkoxypolysiloxane which is to be manufactured, and which can be distilled in the column. The alcohol may be substituted by atoms or groups which are inert towards the chlorosilane under the particular reaction conditions. Examples of alcohols which can be employed in the process of the invention are methanol, ethanol, beta-methoxyethanol, n-propanol, isopropanol and n-hexanol.

If water is used conjointly in the process according to the invention, it is preferably also introduced into the column in a gaseous form. The water can be introduced into the column as a mixture with the alcohol or separately from the alcohol. When it is introduced into the column separately from the alcohol, it can be introduced into the column at any desired position.

The expression "in the gaseous form" or "gaseous" in connection with alcohol and/or water means that in the process of the invention one or both substances are introduced at temperatures at or above their boiling point at the pressure prevailing in the column, and in the vaporized state.

In the process of the invention, the column used can be any pipe provided with packings or inserts of the type which can be employed for fractionation in fractional distillation, for example a packed column. The column is preferably at least 90 cm. long. The upper limit of the column length is merely a question of economics.

The process of the invention is preferably carried out at the pressure of the surrounding atmosphere, that is to say at 760 mm. Hg (absolute) or about 760 mm. Hg (absolute), because, when working at the pressure of the surrounding atmosphere, expenditure on, for example, corrosion-resistant pumps is dispensed with. However, if, for example, because of the boiling points of the reactants or because the alcohol cannot be distilled without decomposition under normal pressure, working under normal pressure is undesirable or impossible it is possible to work at higher or lower pressures.

At the start up of the process, an excess of the gaseous alcohol, that is to say somewhat more than the amount theoretically required for the reaction of all Si-bonded chlorine atoms in the chlorosilane simultaneously introduced into the column is introduced into the column in order to ensure that during the reaction excess alcohol boiling under reflux is always present at the column head. As soon as the reflux of excess alcohol has started, only that amount of alcohol is introduced into the column as is removed from the column by the reaction with the chlorosilane, by removal together with the hydrogen chloride formed in the reaction and with the alkoxysilane or alkoxypolysiloxane and possibly by withdrawal through the reflux condenser in order to ensure that over at least two-thirds of the zone between the inlet of the alcohol and the inlet of the silane into the column, the column can be kept, over its entire internal cross-section, at a temperature of at least ½° C. above the boiling point of the particular alcohol used at the pressure prevailing in the column, by means of the heat of reaction, the heat of the reactants introduced into the column, especially the heat of the alcohol, and, if necessary, heating. This is most simply achieved by an initial heating of the column using an external temperature of about 25° C. above the boiling point of the alcohol, by so regulating the speed of addition of the silane at a particular constant speed of addition of alcohol and alcohol temperature, or by so regulating the speed of addition of the alcohol and the alcohol temperature, at a given constant speed of addition of the silane, that about 300 mm. below the point of introduction of the silane into the column the temperature becomes established at a constant value of ½° C. to 12° C. above the boiling point of the particular alcohol used at the particular pressure prevailing in the column. As a third possibility, a constant amount of excess alcohol can be introduced into the column if the excess thus introduced is withdrawn from the column contents through the reflux condenser. This third possibility is, however, only appropriate if there is a demand for alcohol containing hydrogen chloride.

The following examples illustrate the invention.

EXAMPLE 1

A 2,400 mm. long glass tube of 50 mm. internal diameter, which is filled with 4 mm. Raschig rings made of glass, is heated at the beginning of the reaction by a double jacket filled with heating oil kept at 100° C., and is provided at the head with a reflux condenser operated at −20° C., is used as the column. Methyltrichlorosilane at room temperature is introduced at the head of the column, and ethanol in the gaseous form and at a temperature of 110° C. is introduced 1,700 mm. below the point at which the silane is introduced. After ethanol has started to reflux, the speed of addition of the ethanol is 45.5 mols/hour. The speed of addition of the methyltrichlorosilane is regulated in such a way that 300 mm. below the point of introduction of the silane into the column the temperature is 82±2° C. and that therefore the temperature in the column, between the position 300 mm. below the point of introduction of the silane and the point of introduction of the alcohol is kept above the boiling point of the ethanol over the entire internal cross-section of the column. On average, the speed of addition of the silane is 15 mols/hour. The material which issues from the lower end of the column is freed from ethanol in a circulatory evaporator, and this ethanol together with fresh ethanol is recycled into the column. The methyltriethoxysilane thus obtained runs via a syphon and a product cooler into the receiver. 15 mols/hour of methyltriethoxysilane, the purity of which is 99.8% of theory as determined by gas chromatography, and the hydrogen chloride content of which is less than 1 p.p.m., are obtained.

EXAMPLE 2

The procedure described in Example 1 was repeated four times, with the modification that in place of methyltrichlorosilane, phenylchlorosilane, silicon tetrachloride, vinyltrichlorosilane and dimethyldichlorosilane were used respectively.

Phenyltriethoxysilane, ethyl-ortho-silicate, vinyl-triethoxysilane and dimethyldiethoxysilane are obtained respectively, in each case in a purity and yield of above 99 percent by weight and with a hydrogen chloride content of less than 5 p.p.m.

EXAMPLE 3

The procedure described in Example 1 is repeated with the modifications that the heating oil in the double jacket is kept at 90° C., that instead of methyltrichlorosilane gamma-chloropropyltrichlorosilane is used, that instead of ethanol gaseous methanol at a temperature of 90° C. is introduced into the column and that as a result of regulating the addition of silane 300 mm. below the point of introduction of the silane the temperature in the column is 68±2° C.

Gamma-chloropropyltrimethoxysilane is obtained in a purity and yield of over 99 percent by weight, containing less than 1 p.p.m. of hydrogen chloride.

EXAMPLE 4

The procedure described in Example 1 is repeated four times with the following modifications in place of ethanol gaseous methanol, gaseous beta-methoxyethanol, gaseous isopropanol and gaseous n-hexanol are used respectively; at the beginning of the reaction, the heating oil in the double jacket is in each case kept 25° C. above the boiling point of the particular alcohol employed; the gaseous alcohol in each case is at a temperature 25° C. above its boiling point; and the speed of addition of the alcohol is in each case so regulated that 300 mm. below the point of introduction of the silane to the column the temperature is 2 to 5° C. higher than the boiling point of the particular alcohol.

Methyltrimethoxysilane, methyltris(beta-methoxyethoxy)silane, methyltriisopropoxysilane and methyltri-n-hexyloxysilane are obtained respectively, in each case in a purity and yield of over 99 percent by weight and with a hydrogen chloride content of less than 5 p.p.m.

EXAMPLE 5

Methyltrichlorosilane is reacted with ethanol as described in Example 1, with the modifications that the methyltrichlorosilane is employed diluted with ¼ of its amount by weight of toluene and that additionally, per mol of silane, 1 mol of water in the gaseous form, at a temperature of 105° C. is introduced at a point about 1,000 mm. below the point of introduction of the silane into the column.

A mixture of low molecular weight methylethoxypolysiloxanes and methyltriethoxysilane is obtained with a yield of over 99 percent by weight and a hydrogen chloride content of less than 1 p.p.m.

What we claim is:

1. An improved continuous process for the manufacture of substituted or unsubstituted alkoxysilanes and alkoxypolysiloxanes by reacting a chlorosilane with a substituted or unsubstituted alcohol in a column provided with a reflux condenser at an elevated temperature, the improvement which comprises (a) introducing a chlorosilane of the formula $R_nSiCl_{4-n}$ wherein R is selected from the group consisting of hydrogen, hydrocarbon radicals and substituted hydrocarbon radicals in which the substituted groups are inert under the reaction conditions and $n$ is a number of from 0 to 3, at the head of the column and a substituted or unsubstituted aliphatic alcohol having up to 6 carbon atoms in which the substituted groups are inert to the chlorosilane under the reaction conditions is introduced in a gaseous state at a point below the point of introduction of the chlorosilane or in the lowest one-third of the length of the column, (b) removing the reaction product from the column at a point below the point of introduction of the alcohol, (c) maintaining the temperature over the entire internal cross-section of at least two-thirds of the zone between the inlet of the alcohol and the inlet of the silane above the boiling point of the alcohol at the pressure prevailing in the column and (d) maintaining at the head of the column an excess of alcohol boiling under reflux during the reaction.

2. The process of claim 1 wherein the reaction is conducted in the presence of water.

3. The process of claim 2, wherein the water is introduced into the column in the gaseous state.

4. The process of claim 2, wherein the water is introduced into the column together with the alcohol.

5. The process of claim 1 wherein the alcohol is selected from the class consisting of methanol, ethanol, β-methoxyethanol, n-propanol, iso-propanol and n-hexanol.

6. The process of claim 1 wherein the chlorosilane is diluted with an inert solvent having a boiling point above the temperature of the column between the point of addition of the alcohol and the silane.

7. The process of claim 1 wherein the chlorosilane is a mixture of chlorosilanes.

References Cited

UNITED STATES PATENTS

| | | | |
|---|---|---|---|
| 3,244,739 | 4/1966 | Emblem et al. | 260—448.8 R |
| 3,651,117 | 3/1972 | Bennett | 260—448.8 R |
| 2,947,772 | 8/1960 | Eynon et al. | 260—448.8 R |
| 3,646,087 | 2/1972 | Bennett et al. | 260—448.8 R X |
| 3,448,138 | 6/1969 | Dewit | 260—448.8 R |
| 2,995,592 | 8/1961 | Peeler et al. | 260—448.8 R |
| 2,415,389 | 2/1947 | Hunter et al. | 260—448.8 R X |
| 2,624,749 | 1/1953 | Bunnell | 260—448.8 R |

DANIEL E. WYMAN, Primary Examiner

P. F. SHAVER, Assistant Examiner

U.S. Cl. X.R.

260—46.5 R, 448.8 R